Nov. 19, 1940.                    C. E. SNYDER                    2,222,047
                    APPARATUS FOR REMOVING LIQUID FROM TIRES
                         Filed April 6, 1938          2 Sheets-Sheet 1
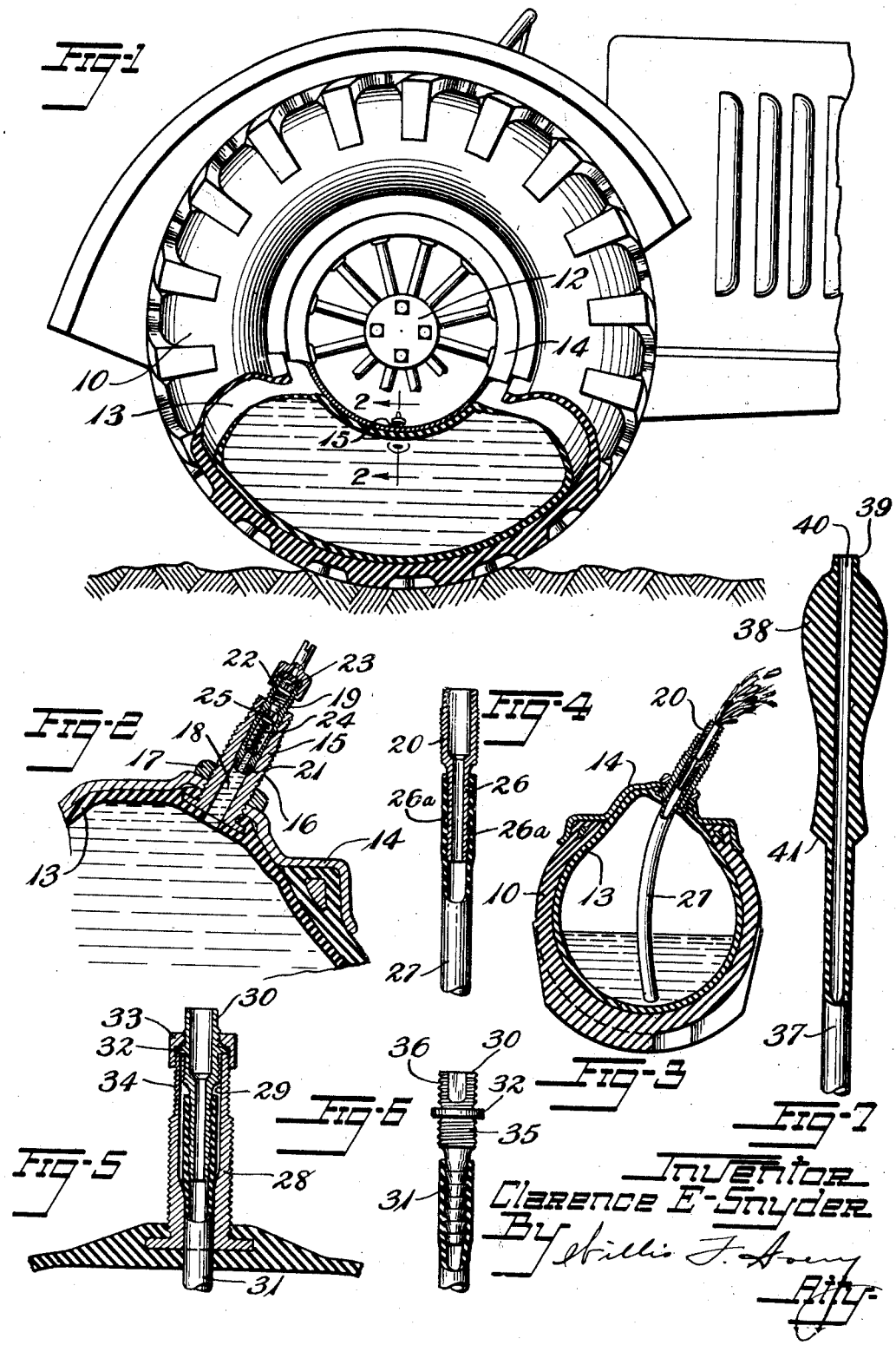

Nov. 19, 1940.   C. E. SNYDER   2,222,047
APPARATUS FOR REMOVING LIQUID FROM TIRES
Filed April 6, 1938   2 Sheets-Sheet 2
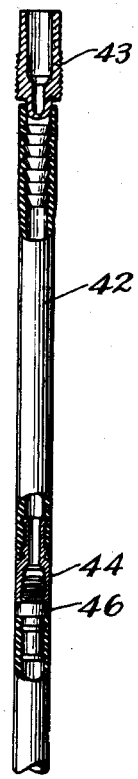
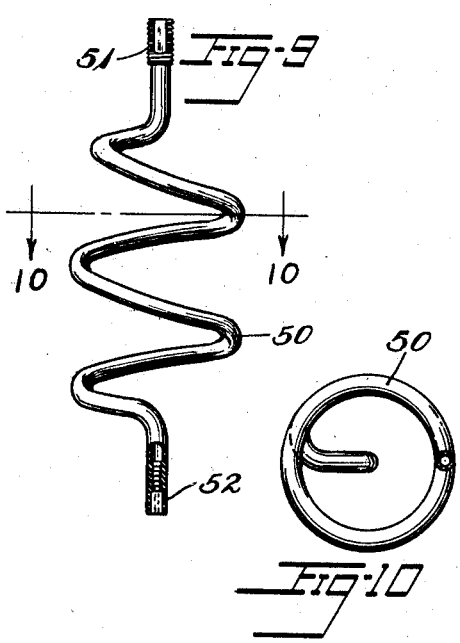
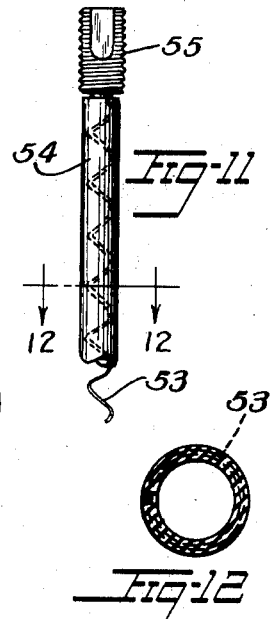
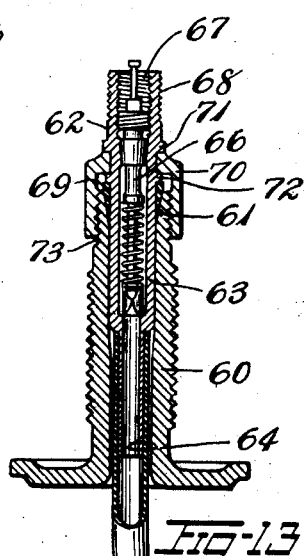
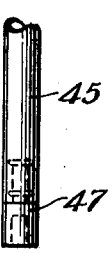
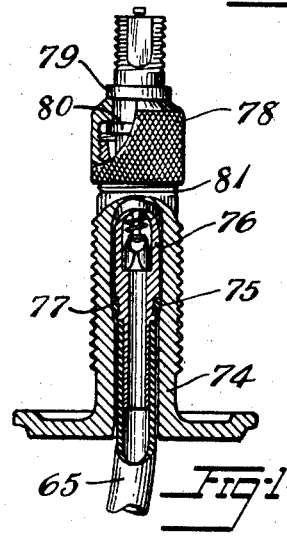
Inventor
Clarence E. Snyder Patented Nov. 19, 1940

2,222,047

UNITED STATES PATENT OFFICE 2,222,047

APPARATUS FOR REMOVING LIQUID FROM TIRES

Clarence E. Snyder, Akron, Ohio, assignor to The B. F. Goodrich Company, New York, N. Y., a corporation of New York Application April 6, 1938, Serial No. 200,345

14 Claims. (Cl. 152—330)

This invention relates to apparatus for removing liquids from inflatable tires such as are used on farm tractors and other vehicles.

The weighting of the pneumatic tires of tractor and other vehicles by the filling, partially or completely, with water or other liquid has the advantages of increasing the traction on soft soil and improving the riding qualities, especially by reducing bouncing. Occasionally it is desired to remove the liquid completely from the tire, and while a large part of the liquid may be drained from the tire by gravity by opening the valve and disposing the wheel with the valve stem at its lowermost position, a considerable amount of liquid necessarily has remained in the tire. For the removal of this residual liquid it has been necessary in some cases even to remove the tire with difficulty and actually cut the inner tube to drain out the residual liquid, after which the tube has required patching before reassembly on the wheel.

Because it is necessary at times to evacuate the liquid where extensive service equipment is not available, it is desirable to provide evacuating mechanism that may feasibly be carried with the vehicle. Also it is desirable that the parts may be replaced inexpensively. The principal objects of the invention are to provide improved apparatus for evacuating liquid from the tire; to provide for simplicity of mechanism; and to provide for convenience and effectiveness of operation.

These and other objects will appear from the following description and the accompanying drawings, illustrating several embodiments of the invention.

Of the drawings:

Fig. 1 is a side elevation of a tractor wheel and the associated parts of a tractor, parts of the tractor being broken away and parts of the tire being broken away and shown in section.

Fig. 2 is a sectional detail view of the tire valve thereof, taken on line 2—2 of Fig. 1, the tire, tube, and rim being partly shown and in section.

Fig. 3 is a cross-sectional view of a mounted tire equipped with evacuating apparatus of this invention and discharging the water therefrom.

Fig. 4 is a view to a larger scale showing the evacuating tube and its connecting member of Fig. 3, parts being shown in section.

Fig. 5 is a cross-sectional view of a valve stem with another form of evacuator mounted therein.

Fig. 6 is a cross-sectional view of the evacuating tube of Fig. 5, parts being shown in section.

Fig. 7 is a side elevation, partly in section, of a modified form of evacuating tube adapted for temporary insertion into the valve stem of the tire.

Fig. 8 is a view of a sectional evacuating tube, shown partly broken away and in section.

Fig. 9 is a side elevation of a modified form of evacuating tube, extensible and compressible in length to fit tires of different dimensions, parts being shown in section.

Fig. 10 is a view taken along the line 10—10 of Fig. 9.

Fig. 11 is a detail view of a portion of a wire reinforced evacuator tube, constituting a further modified form of the invention.

Fig. 12 is a cross-sectional view of the same, taken on line 12—12 of Fig. 11.

Fig. 13 is a vertical section of a further modified form of the invention comprising a valve stem receiving a valve housing and an associated evacuator tube.

Fig. 14 is an elevation, partly in section, of a modified construction.

Referring to the drawings, the numeral 10 designates the tire casing applied to a tractor wheel 12. An inner tube 13 enclosed by the casing and the rim 14 of the wheel, which is of the drop center type, has a tubular valve stem 15 attached at its base to the inner tube and is disposed so as to extend through an aperture in the rim 14. The stem 15 is exteriorly threaded, as at 16 to receive a clamp nut 17 whereby the tube is clamped against the rim at the aperture. The valve stem 15 preferably has a bore larger in diameter than that of the conventional air stem to provide a passage 18 therethrough of sufficient size to permit rapid flow of a fluid therethrough and to admit an evacuating tube, hereinafter described. The stem is threaded interiorly to interchangeably receive a core housing 19 or a nipple 20. For sealing the core housing 19 to the valve stem 15, a rubber gasket 21 carried by the end of the core housing is adapted to be compressed between a conical smooth bored shoulder of the valve stem and a conical nose of the core housing. The core housing 19 is tubular and contains the ordinary "valve insides" or core 22 comprising a valve stem 23, spring 24 and hollow threaded valve seat 25 whereby the tire may be inflated with air.

The valve housing may be removed at any time and replaced by the nipple 20 similarly threaded on its outside and having a portion 26 of reduced size to which a flexible tube 27 of rubber or other material, having an outside diameter small enough to pass through the valve stem 15, is mounted. The portion 26 may be provided with circumferential ridges 26a, 26a, or other rough formations to resist removal of the tube 27, which tube may be simply slipped on, or if desired adhered or bonded to the housing.

It is desired at times to remove all the water or other liquid from the tire, as when freezing weather is to be prepared for, or when it is desired to remove weight from the vehicle for some agricultural operation such as cultivating in which it is preferred that the tires do not bear too heavily on the soil. A large part of the water may be drained from the tire by positioning the wheel with the valve stem in its lowermost position, and allowing the water to flow through the opened stem. But a very considerable amount of water ordinarily remains, occupying the space in the tire up to the valve stem. When it is desired to remove the residual water, the core housing 19 is replaced by the tube 27 and nipple 20. The end of the tube 27 is of such length as to reach the lowest part of the tire, as shown in Fig. 3. An air hose may be applied to the end of the nipple 20 and air forced into the inner tube in the event the remaining air pressure in the tube is insufficient for the purpose. The air pressure within the tire will force substantially all the water or other liquid through the tube 27 and out of the tire, as shown in Fig. 3.

An optional construction of valve stem and evacuator tube is illustrated in Figs. 5 and 6, where a hollow metal valve stem 28 is provided with a smooth counterbore 29 to receive the metal nipple 30 and rubber evacuator tube 31. In this form of the invention, the nipple 30 is provided with a flange 32 larger than the counterbore 29 and a union nut 33 engages over threads 34 on the valve stem to draw the flange into engagement with the end of the valve stem. The nipple 30 may also be formed with threads 35 below the flange so as to be interchangeably used in the valve stem 15 of Fig. 2, and may be provided with threads 36 above the flange to engage the nut 33 if desired.

The evacuator tube of Fig. 7 is of all rubber construction, and comprises a tube 37 integral with a handle 38 terminating in a nipple 39, and having a bore 40 extending axially therethrough. The tube 37 is of such dimensions as to permit its being inserted through a hollow valve stem. The conical seat 41 may be pressed against the outer end of the valve stem by grasping the handle portion, and an air hose may be applied to the nipple 39 to force air into the tire through the bore 40. When the air hose is removed, the water in the tire will be forced out through the tube 37. Leakage of air from the tire is prevented by holding the tube with the seat 41 held tightly against the valve stem to seal the joint.

To facilitate use of the evacuating tube in tires of different dimensions and to assure that the inlet of the tube will be at the lowest point of the tire when the valve stem is at the bottom of the wheel and standing vertically, the tube in any of the forms illustrated my be made in sections detachably joined together as in Fig. 8 where the first section of rubber tubing 42 has one end attached to a nipple 43 of the same type as that of Fig. 4, and its other end is attached to a female metal coupling 44 which may be vulcanized thereto. The other sections of tubing 45 each have a male metal coupling 46 attached to one end thereof, and a female metal coupling 47 attached to the other end thereof. The male and female coupling members are threaded to interchangeably fit each other. The last coupling member 47 serves to weight the end of the tubing so as to cause it to seek the lowest spot in the tire.

Another construction of evacuator tube adapted automatically to seek the lowest portion of the tire and suitable for tires of various sizes, is illustrated in Figs. 9 and 10. Here the tube 50 is vulcanized while coiled in helical form so as to retain such shape and to act as a coil spring. A metal nipple 51 is fixed to its upper end, and a metal bushing 52 is fixed to its lower end for weighting purposes. The tube may be straightened to pass it through the valve stem bore and will then recover its helical shape within the tire with the bushing 52 disposed at the lowermost portion of the tire.

Where it is desired to use a stright single length of tubing as an evacuator tube, the tubing may be made more elastic and stiffer in the direction of its length and may be strengthened against torsional strains and against curling of it by reinforcing its walls with spring wire, as in Figs. 11 and 12 where a helical coil of spring wire 53 or other strip material is embedded in the wall of the tube 54. The stiffness and elasticity of the resulting tube tend to cause its end to stay at the deepest portion of the tire or at its median plane and any tendency to roll up the side walls of the tire as a result, for example, of twisting the tube in screwing the nipple 55 into place in the valve stem is resisted by resistance of the tube to bending and to torsional twist.

In the form of the invention illustrated in Fig. 13, the evacuator tube may remain in the tire at all times, yet may be removed at will, and the tire may be inflated with air while the tube is in place. Also, the only part in addition to the air-inflating mechanism that is required for water evacuation is the piece of rubber tube, which can be replaced inexpensively if lost or damaged. The valve nipple 60 of this embodiment is smooth-bored, which bore is flared at the outer end as at 61. A valve-core housing 62 is formed with a body 63 which slidably fits the straight bored portion of the valve stem, and this housing is provided with an extension or portion 64 of reduced size, upon which the rubber tube 65 is mounted and may be held in place by friction, although, if desired, the extension may be roughened as in the embodiment of Figs. 4 and 5, and the tube may be permanently secured as by adhesion or bonding. A friction fit for detachability is preferred, however. The body 63 is chambered to receive the "valve inside" or core 66, being threaded at its mouth 67 to fit the threaded seat, and on its outside, as at 68, to fit a valve cap. A tapered rubber packing 69 seals the valve stem to the housing, and to compress the packing, a union nut 70 is swiveled on the housing between flanges 71 and 72 and has threads engaging an external thread 73 on the valve stem. When assembled as illustrated the tire may be inflated with air in the ordinary way. When water is to be placed in the tire, the entire valve housing and evacuator tube may be removed by loosening the union nut thereby providing an opening of considerable area for admitting water. When the housing and valve core are replaced, with or without the tube on the extension of the housing, air under pressure may be superimposed upon the water in the tire.

For removal of the water a large portion, but not all, may be drained through the valve stem with the latter in its lowermost position. When the residual water is to be removed, the valve housing with the tube mounted on its extension is placed in the valve stem but the core or "valve inside" is removed; air may then be forced into the tire until the tire is inflated at a few pounds pressure, or the air pressure remaining in the tire may be used for the purpose, and the water is then blown out through the evacuator tube by the air pressure in the tire.

The form of the invention illustrated in Fig. 14 is generally similar to that of Fig. 13, but with a difference in the manner of sealing the housing to the valve stem. The valve stem 74 is smooth-bored but has a conical shoulder 75 adapted to be engaged by a corresponding portion on the housing 76. A rubber gasket 77 is seated in a groove of the conical shoulder of the housing in position to engage the shoulder 75. A union nut 78 is swiveled between shoulders 79, 80 formed on the housing and is threaded to engage threads 81 of the valve stem, thereby to draw the gasket 77 of the housing against the shoulder 75. This construction has the advantage, among others, that the sealing gasket 77 is conveniently accessible for cleaning when the housing is removed from the stem. This construction is like that shown in Fig. 13, and includes a housing extension like the extension 64 upon which the tube 65 is mounted.

These and other modifications may be made without departing from the scope of the invention as it is defined by the following claims.

I claim:

1. Apparatus for removing liquid from an inflatable tire having a valve stem, said apparatus comprising a flexible tube adapted to be inserted through the valve stem to the lowest portion of the tire cavity for conducting fluid out of the tire, and means comprising a threaded connection for engaging the tube with the valve stem.

2. Apparatus for removing liquid from an inflatable tire having a valve stem, said apparatus comprising a flexible liquid-conducting tube adapted to be inserted through the valve stem and having means for engaging the valve stem in sealing engagement therewith, and means associated with the tube for causing its inserted end to seek the lowest portion of the tire cavity.

3. Apparatus for removing liquid from an inflatable tire having a valve stem, said apparatus comprising a flexible liquid-conducting tube of detachably connected sections adapted to be positioned through the valve stem with one end thereof at the lowest portion of the tire cavity and in communication with the valve stem.

4. Apparatus for removing liquid from an inflatable tire having a valve stem, said apparatus comprising a flexible fluid-conducting tube reinforced with spring wire and adapted to be inserted through the valve stem and to extend to the bottom of the tire cavity, and means on said tube for engaging the valve stem in sealing engagement therewith.

5. Apparatus for removing liquid from an inflatable tire having a valve stem, said apparatus comprising a flexible fluid-conducting tube adapted to be inserted through the valve stem, and a weight on the end of the tube to urge the end to the lowest portion of the tire cavity.

6. Apparatus for removing liquid from an inflatable tire having a valve stem, said apparatus comprising a flexible fluid-conducting tube of joined sections insertable through the valve stem, and a weight on the end section for urging it to the lowest portion of the tire cavity.

7. Apparatus for removing liquid from an inflatable tire having a valve stem, said apparatus comprising a flexible tube adapted to be inserted through the valve stem to the lowest portion of the tire cavity, and means for securing the tube to the valve stem.

8. Apparatus for removing liquid from an inflatable tire having a valve stem, said apparatus comprising a flexible tube adapted to be inserted through the valve stem to the lowest portion of the tire cavity, said tube comprising a plurality of sections, and means for securing the tube to the valve stem.

9. Apparatus for removing liquid from an inflatable tire having a hollow valve stem, said apparatus comprising a valve housing insertable in said stem, a flexible tube associated with the said housing and extending into the cavity of the tire, and valve means removably mounted in said housing.

10. Apparatus for removing liquid from an inflatable tire having a valve stem having a bore of substantial diameter, said apparatus comprising a valve housing removably mounted in said stem, means for holding the housing in sealed relation with the stem, said housing having an extension, and a flexible tube adapted to be mounted on the extension and to be disposed at the bottom of the tire cavity for conducting liquid out of the tire through said tube and valve housing.

11. Apparatus for removing liquid from an inflatable tire having a valve stem of such large bore as to admit freely a flowable weighting material such as water, said apparatus comprising a valve housing removably mounted in said stem, means for holding the housing in sealed relation with the stem, a valve in said housing, said housing having an extension of reduced diameter integral therewith and receivable in the stem, and a flexible tube, the end of which is adapted to be mounted upon the extension within the stem with the other end of the tube disposed at the bottom of the tire cavity for conducting liquid out of the tire through said tube and valve housing.

12. Apparatus for removing liquid from an inflatable tire having a valve stem of such large bore as to admit freely a flowable weighting material such as water, said apparatus comprising a valve housing removably mounted in said stem, means for holding the housing in sealed relation with the stem, a valve in said housing, and a flexible tube adapted to be positioned with the end of the tube disposed at the bottom of the tire cavity for conducting liquid out of the tire through said tube and stem.

13. Apparatus for removing liquid from an inflatable tire having a valve stem, said apparatus comprising a flexible tube adapted to be inserted through the valve stem to the lowest portion of the tire cavity, and means on said tube for engaging the valve stem.

14. Apparatus for removing liquid from an inflatable tire having a valve stem, said apparatus comprising a flexible tube adapted to be inserted through the valve stem to the lowest portion of the tire cavity, and means for sealing the tube against the valve stem.

CLARENCE E. SNYDER.

DISCLAIMER 2,222,047.—*Clarence E. Snyder*, Akron, Ohio. APPARATUS FOR REMOVING LIQUID FROM TIRES. Patent dated November 19, 1940. Disclaimer filed June 14, 1943, by the assignee, *The B. F. Goodrich Company*.

Hereby disclaims claims 1, 7, 13, and 14 of said patent.

[*Official Gazette July 6, 1943.*]